United States Patent [19]

Sumitani et al.

[11] Patent Number: 4,802,529
[45] Date of Patent: Feb. 7, 1989

[54] REFRIGERANT-HEATING TYPE HEATING APPARATUS

[75] Inventors: Shigeto Sumitani; Haruo Noguchi, both of Fuji; Hiroyuki Araya, Fujinomiya, all of Japan

[73] Assignee: Kabushiki Kaisha Toshiba, Kawasaki, Japan

[21] Appl. No.: 143,709

[22] Filed: Jan. 14, 1988

[30] Foreign Application Priority Data

May 25, 1987 [JP] Japan .............................. 62-127702

[51] Int. Cl.4 ............................................. F25B 29/00
[52] U.S. Cl. ...................................... 165/29; 165/921; 237/2 B; 62/238.6; 62/238.7
[58] Field of Search ................. 165/29, 921; 237/2 B; 62/238.6, 238.7

[56] References Cited

U.S. PATENT DOCUMENTS

| | | | |
|---|---|---|---|
| 4,112,705 | 9/1978 | Sisk et al. | 165/29 |
| 4,318,366 | 3/1982 | Tompkins | 165/921 |
| 4,420,034 | 12/1983 | Vander Vaart | 237/2 B |
| 4,441,901 | 4/1984 | Endoh | 165/29 |
| 4,445,638 | 5/1984 | Connell et al. | 165/921 |
| 4,457,137 | 7/1984 | Kohzuma | 165/29 |
| 4,482,008 | 11/1984 | Nomaguchi et al. | 165/29 |
| 4,506,521 | 3/1985 | Asano et al. | 237/2 B |
| 4,516,408 | 5/1985 | Chiba | 62/238.7 |
| 4,553,401 | 11/1985 | Fisher | 237/2 B |
| 4,687,133 | 8/1987 | Karlstedt | 237/2 B |

Primary Examiner—Albert W. Davis, Jr.
Assistant Examiner—John K. Ford
Attorney, Agent, or Firm—Cushman, Darby & Cushman

[57] ABSTRACT

A heating apparatus includes a refrigeration cycle having a compressor, an indoor heat exchanger, and a refrigerant-heating unit. The unit includes a heat exchanger section through which a refrigerant flows, a burner, and a guide duct for guiding a combustion gas produced by the combustion of the burner so as to heat the refrigerant flowing through the heat exchanger section. A combustion rate of the burner is controlled in accordance with the difference between a room temperature and a preset temperature. When the combustion rate is within a specified range, it is shifted, in accordance with the temperature of the refrigerant flowing into the heat exchanger section, so as to prevent the condensation of water vapor in the combustion gas flowing through the guide duct.

5 Claims, 4 Drawing Sheets

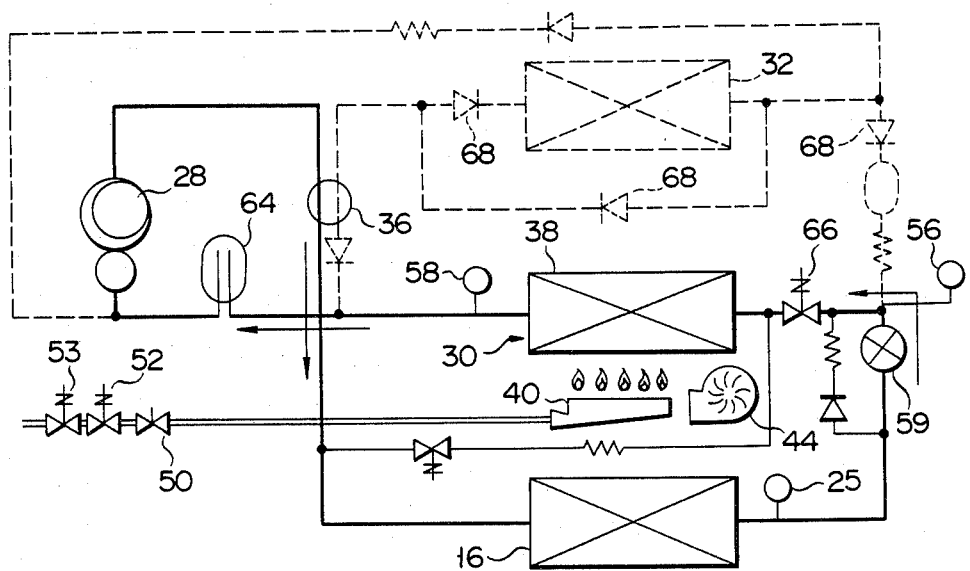
F I G. 2
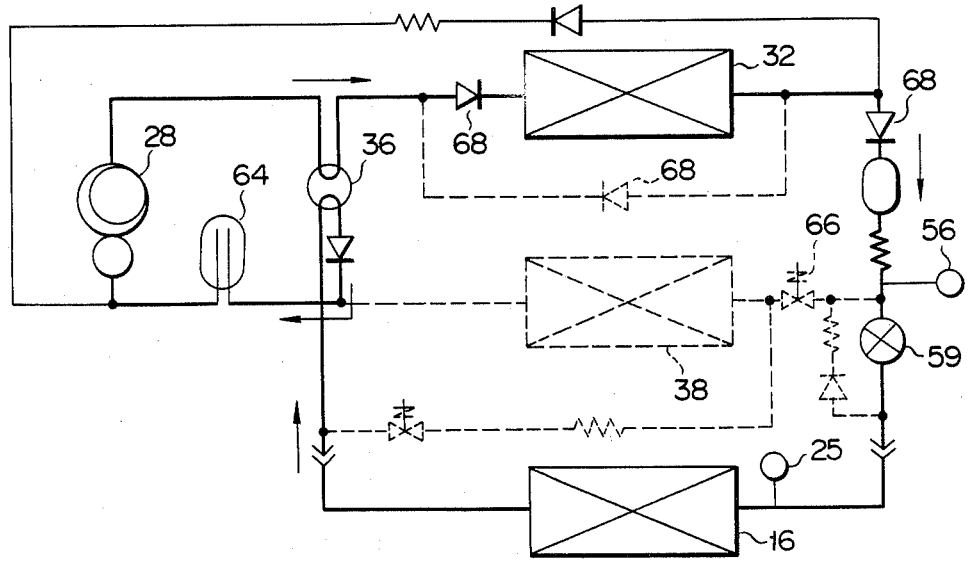
F I G. 3

REFRIGERANT-HEATING TYPE HEATING APPARATUS

BACKGROUND OF THE INVENTION

This invention relates to a refrigerant heating type heating apparatus which heats an evaporator of the refrigeration cycle by means of a burner, and discharges the heat in a room by using a condenser thereby heating the room.

Conventionally, a heating apparatus of this type comprises a refrigeration cycle constructed by connecting a compressor, a condenser, refrigerant flow rate adjusting means, and an evaporator in a circuit, an indoor fan located near the condenser, and a gas burner provided near the evaporator to heat it. A fuel gas is supplied to the gas burner from a fuel gas source. The evaporator is installed in or on a housing for guiding the combustion gas of the burner.

The compressor, when it is driven, discharges a high-temperature gas refrigerant. This refrigerant serves for the heating operation as it circulates passing through the condenser, flow rate adjusting means and evaporator. In the heating operation, when the gas burner is ignited, the combustion gas of the burner flows through the housing, thus heating the evaporator. When the refrigerant is evaporated in the evaporator, is absorbs a large amount of heat. This latent heat is radiated into a room when the refrigerant condenses in the condenser, thereby heating the room.

In a heating apparatus constructed as described above, the combustion rate of the gas burner in the heating operation is controlled by an indoor command that is determined in accordance with an optionally set temperature and an actual room temperature detected by a room temperature sensor. At the same time, the flow rate adjusting means is controlled such that an outlet temperature of the evaporator to be heated or the difference between the outlet temperature and an inlet temperature of the evaporator has a predetermined value.

However, in a heating apparatus operated under the above-mentioned control system, water vapor contained in the combustion gas condenses on the inner surfaces of the housing, particularly, when the room temperature is low and the combustion rate of the burner is small. The condensation water corrodes the housing and evaporator, thus decreasing durability of the heating apparatus.

SUMMARY OF THE INVENTION

The present invention has been made in consideration of the above situation and has as its object to provide a refrigerant heating type heating apparatus which can prevent condensation of the water vapor contained in a combustion gas and thus being improved in durability.

In order to achieve the above object, a heating apparatus according to this invention comprises a refrigeration cycle including a compressor, an indoor heat exchanger arranged in a room, a refrigerant heating unit for heating a refrigerant, and refrigerant tubes connecting the above components to one another, the refrigerant heating unit having a heat exchanger section through which a refrigerant flows, heating means whose combustion rate is adjustable, and guide means for guiding a combustion gas produced by an operation of the heating means so as to heat the refrigerant flowing in the heat exchanger section; indoor temperature detecting means for detecting the temperature of the room; temperature presetting means for presetting a desired room temperature; refrigerant temperature detecting means for detecting the temperature of the refrigerant flowing into the heat exchanger section; and control means for driving the heating means at a combustion rate according to the difference between the room temperature detected by the temperature detecting means and the preset temperature preset by the temperature presetting means and for shifting the combustion rate of the heating means, in accordance with the refrigerant temperature detected by the refrigerant temperature detecting means, so as to prevent condensation of water vapor in the combustion gas flowing through the guide means when the combustion rate of the heating means is in a specified range.

BRIEF DESCRIPTION OF THE DRAWINGS

FIGS. 1 to 5 show a heating apparatus according to an embodiment of this invention, in which FIG. 1 is a view schematically showing the whole heating apparatus;

FIGS. 2 and 3 are circuit diagrams showing the flow of the refrigerant in the heating and cooling operations of the heating apparatus, respectively;

FIG. 4 is a flow chart showing a control method of the heating unit in accordance with the temperature of the refrigerant at the inlet of the heating unit; and FIG. 5 is a flow chart showing a control method of the whole heating apparatus.

DETAILED DESCRIPTION OF THE PREFERRED EMBODIMENT

A refrigerant-heating type air conditioner as a preferred embodiment of this invention will now be described with reference to the accompanying drawings.

Figure 1:
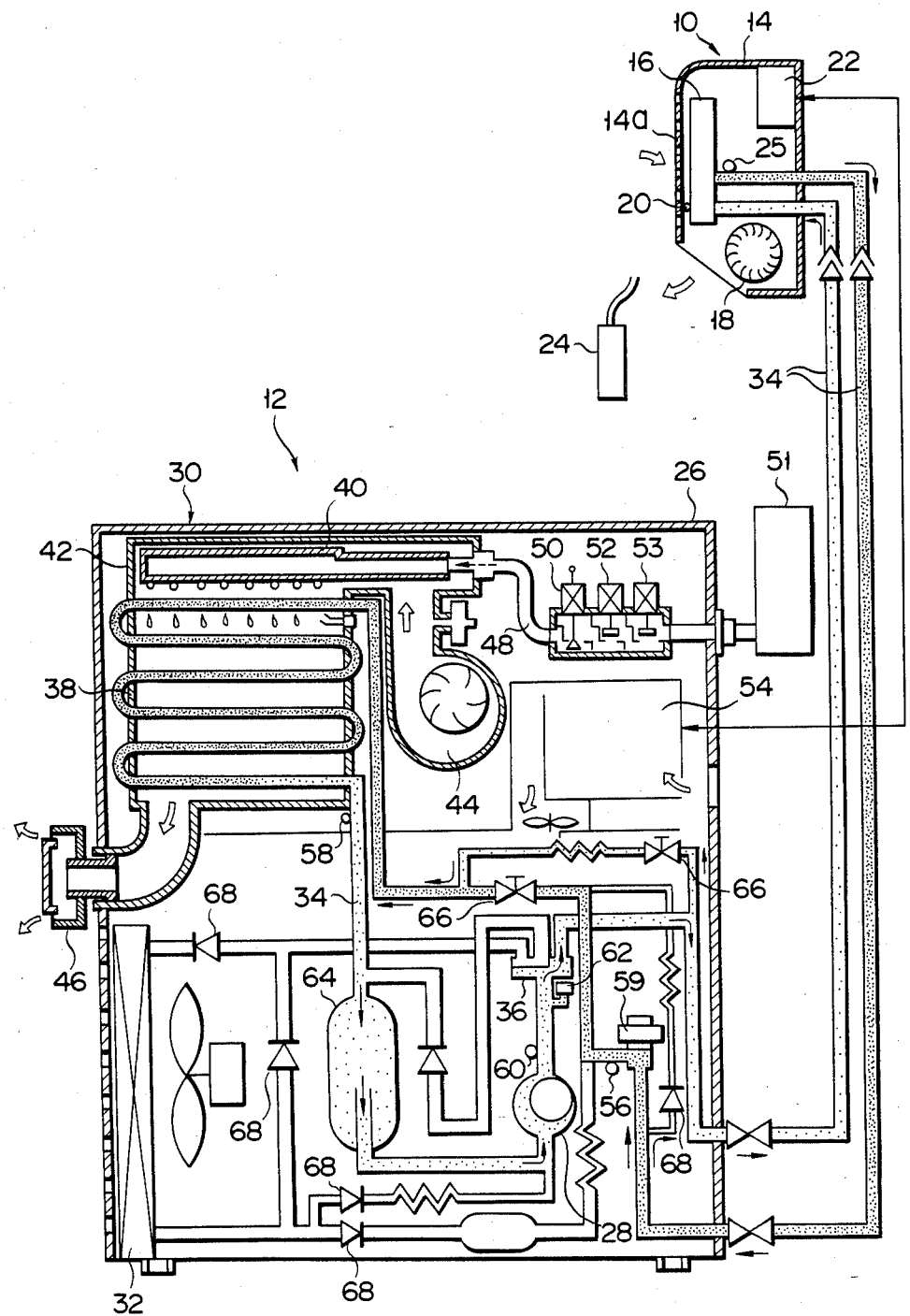

As is shown in FIG. 1, an air conditioner comprises indoor unit 10 arranged in a room and outdoor unit 12 arranged outdoors and connected to the indoor unit.

Indoor unit 10 has case 14, indoor heat exchanger 16, and indoor fan 18, the latter two being located in the case. Near air suction port 14a of case 14 is provided room temperature sensor 20 for detecting the temperature in the room. Indoor control unit 22 is installed in case 14 and controls the operation of the air conditioner in response to input commands from an operation panel (not shown) or remote controller 24. Provided near heat exchanger 16 is indoor heat exchange sensor 25 for detecting the temperature of a refrigerant flowing into or discharged from heat exchanger 16. The temperature, which is detected by sensor 25, is utilized in controlling the airflow of fan 18 and controlling the high pressure in a heating operation and also in preventing the freezing of heat exchanger 16.

Outdoor unit 12 includes housing 26, compressor 28 located in the housing, refrigerant heating unit 30, and outdoor heat exchanger 32 which is used in a cooling operation of the air conditioner. Compressor 28, unit 30, outdoor heat exchanger 32, and indoor heat exchanger 16 are connected by means of refrigerant tubes 34, constituting a refrigeration cycle. Heat exchangers 16, 32 and heating unit 30 are connected so as to be parallel with compressor 28 by means of four-way valve 36. During the heating operation of the air conditioner, the refrigerant discharged from compressor 28 flows through four-way valve 36, indoor heat exchanger 16, and heating unit 30 in this order. During the cooling operation, the refrigerant flows through compressor 28, four-way valve 36, outdoor heat exchanger 32, and indoor heat exchanger 16.

Refrigerant heating unit 30 comprises heat exchanger section 38 which is connected with refrigerant tube 34 and through which the refrigerant flows, gas burner 40, and guide duct 42 defining a combustion chamber for guiding combustion gas produced by the combustion of gas burner 40. Heat exchanger section 38 is arranged in guide duct 42 so that the refrigerant flowing through the heat exchanger section is heated by the combustion gas flowing in guide duct 42. Combustion fan 44, for supplying air to the guide duct to be used for combustion of gas burner 40, is provided at the inlet side of guide duct 42. Exhaust top 46 is provided at the outlet of guide duct 42. Burner 40 is connected to fuel gas source 51 through gas supply tube 48. In the middle of tube 48 are arranged gas proportional control valve 50 for adjusting the amount of fuel gas to be supplied to burner 40 and a pair of electromagnetic valves 52, 53 for opening and closing gas supply tube 48. Those valves 50, 52 and 53 are drive by control unit 54 located in housing 26.

Outdoor unit 12 is equipped with heating inlet sensor 56 for detecting the temperature of the refrigerant flowing into refrigerant heating unit 30, and heating outlet sensor 58 for detecting the temperature of the refrigerant discharged from heating unit 30. The temperature detected by sensor 58 is utilized in preventing excessive heating of the refrigerant, and in controlling expansion valve 59 in accordance with the difference from the temperature detected by sensor 56. Discharge sensor 60 for detecting the temperature of the refrigerant discharged from compressor 28 and high-pressure switch 62 for stopping the refrigerant cycle operation, are provided on the discharge side of compressor 28. Sensor 60 actuates high-pressure switch 62 when it finds that the detected temperature exceeds a specified value, that is, when compressor 28 is at an abnormally high-pressure. Between the suction side of compressor 28 and heating unit 30, accumulator 64 for separating the refrigerant discharged from the heating unit into an evaporated refrigerant and a liquid refrigerant, is provided in refrigerant tube 34. In FIG. 1, reference numeral 66 indicates a two-way valve, and 68 indicates a check valve.

The operation of the refrigerant heating type air conditioner having the above mentioned construction will be described.

To perform heating, the heating operation mode and a desired room temperature Ts are set by remote controller 24. Then, when an operation switch, which is not shown, is turned on, compressor 28 is driven, burner 40 is ignited, and refrigerant heating unit 30 is put into operation. As is shown in FIGS. 1 and 2, the refrigerant compressed in compressor 28 is supplied, in the evaporated state, to indoor heat exchanger 16 through four-way valve 36. There frigerant is liquefied by condensation in heat exchanger 16, and, in this process, the refrigerant radiates its latent heat. The air in the room circulated by indoor fan 18 is heated by the radiated heat, thereby heating the room.

The refrigerant liquefied by heat exchanger 16 flows through expansion valve 59 into heat exchanger section 38 of refrigerant heating unit 30. Heat exchanger section 38 is heated by the flame of burner 40 and the combustion gas flowing through guide duct 42. Therefore, the refrigerant flowing in heat exchanger section 38 is heated and evaporated, in which process, the refrigerant absorbs heat as latent heat. The evaporated refrigerant then returns to compressor 28 through accumulator 64. The heating operation is performed by the repetitive execution of the above cycle.

In the heating operation, the combustion rate of burner 40 is controlled as follows.

Indoor control unit 22 calculates the difference between the room temperature Ta detected by sensor 20 and the preset temperature Ts, namely Ta−Ts. According to the calculation result, control unit 54 outputs an operation command for controlling the combustion rate of burner 40 of refrigerant heating unit 30. More specifically, control unit 54 controls the opening degree of gas proportional control valve 50 so as to adjust the amount of fuel gas supplied to burner 40 as the result, the thermal power, that is, the combustion rate of the burner is determined.

In this embodiment, the combustion rate of burner 40 is divided into 13 levels. In accordance with the above-mentioned operation command, the burner is operated at a specified level. If the temperature difference (Ta−Ts) is higher a specified value, for example 2.5° C., burner 40 is operated at the 12th level, that is, at the highest combustion rate, when an operation command is output. As the room temperature gradually raises by the heating operation, the temperature difference (Ta−Ts) is reduced gradually. Accordingly, the combustion level of burner 40 is lowered by steps of one level. In this manner, the combustion rate of burner 40 is repeatedly controlled so that the temperature difference (Ta−Ts) approaches zero.

Figure 4:
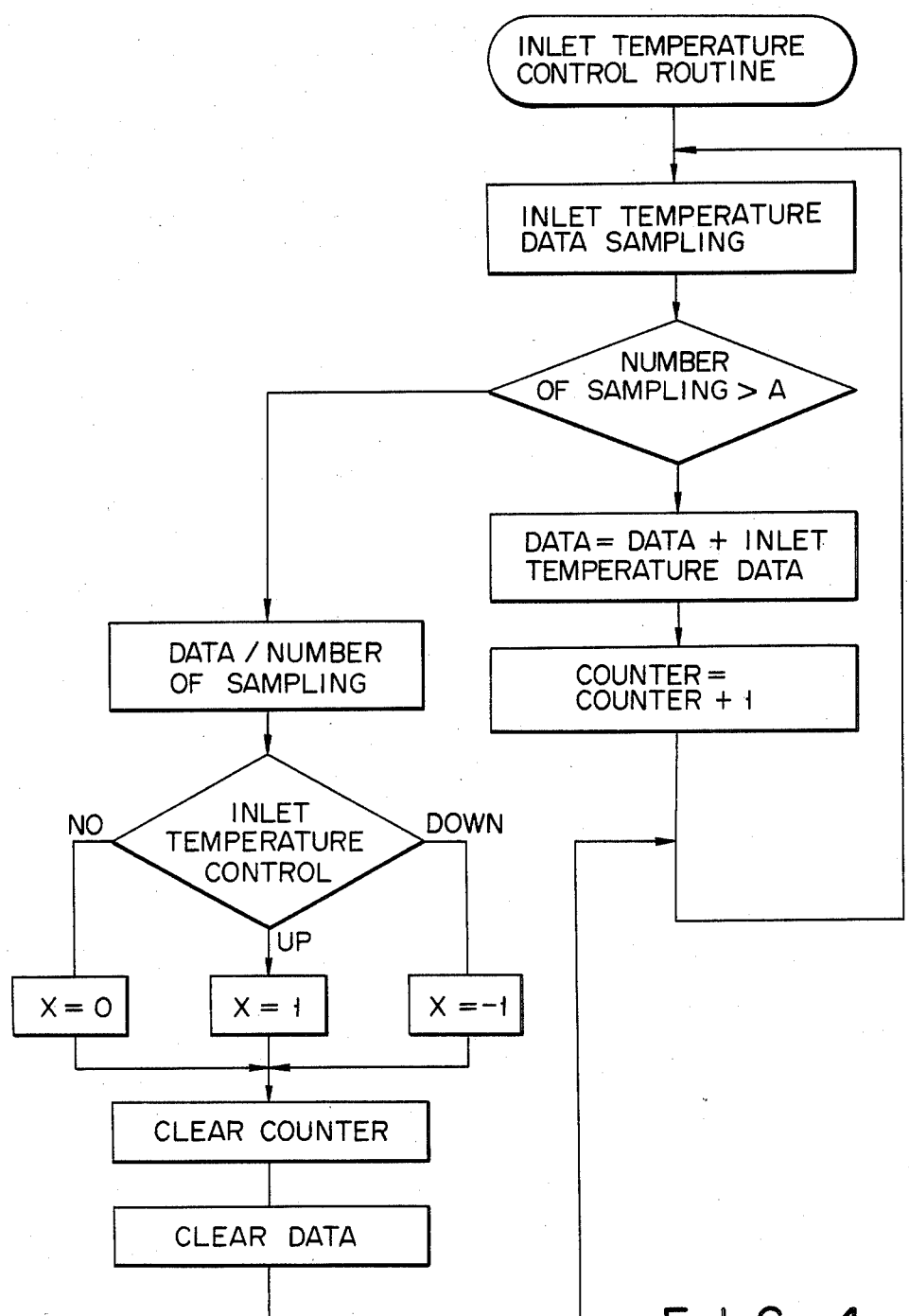

When the operation level of burner 40 is set within a specified range of the third level to the sixth level, for example, ahead of the above-mentioned control based on the temperature difference, control of the burner according to the temperature detected by heating inlet sensor 56 is executed. That is to say, control of the burner according to the temperature of the refrigerant flowing into heating unit 30 (inlet temperature control routine) is executed as is shown in FIG. 4. More specifically, when the operation level of burner 40 is at somewhere from the third level to the sixth level, the refrigerant temperature detected by sensor 56 is sampled for a specified number of times at certain time intervals. The sum of sampling data is stored and the number of times of sampling is counted by a counter. When the number of times of sampling reaches a specified value A, the sum of data is divided by the value A to obtain the average temperature of the refrigerant. In accordance with this average temperature, control unit 54 outputs a correction value X for the current operation level of burner 40. When the average temperature is lower than a specified vlaue T, for example 33° C., a signal of +1 is output as a correction value X, and as a result, the operation level of burner 40 is raised by one step from the current level. Conversely, when the average temperature is higher than 33° C., a correction value of X = −1 is output, thereby lowering the burner operation level by one step. The specified temperature T is determined based on the experimental result that the water vapor in the combustion gas of the burner will be condensed on the inner surface of guide duct 42 when burner 42 was operated in a range from the third level to the sixth level and the temperature of the refrigerant flowing into heating unit 30 fell below the temperature T. The condensation of water vapor in guide duct 42 can be prevented by raising the burner operation level by steps of one level when the temperature of the refrigerant falls below 33° C.

The inlet temperature control routine is canceled in the following cases, and thereafter, the operation of burner 40 is controlled according to the difference between the room temperature and the preset temperature.

(1) The burner operation level preset in accordance with the temperature difference (Ta−Ts) agrees with the current burner operation level shifted in compliance with the inlet temperature control routine.

(2) The burner operation level has exceeded the sixth level after the burner operation level was shifted in compliance with the inlet temperature control routine.

(3) The operation command based on the temperature difference (Ta−Ts) was changed.

(4) Abnormal temperature control has been executed in accordance with the temperature detected by sensors 58, 60, or release control according to the temperature detected by sensor 58 has been executed.

Figure 5:
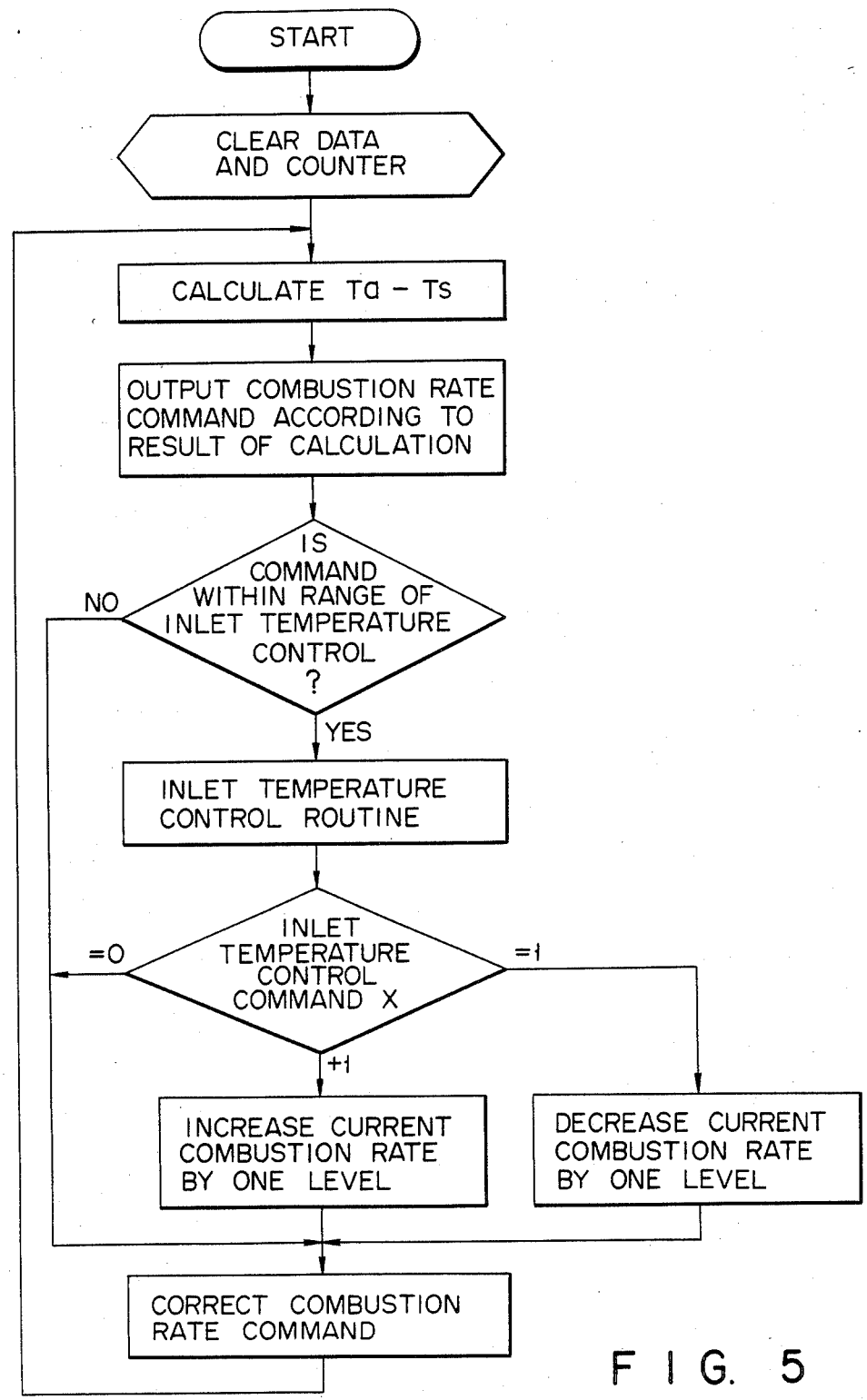

FIG. 5 is a flow chart showing the whole procedure of control of the combustion rate of burner 40.

To perform cooling, the cooling operation mode and a desired room temperature are set with remote controller 24. When the operation switch is turned on, the refrigerant compressed by compressor 28 is supplied through four-way valve 36 to outdoor heat exchanger 32 as is shown in FIG. 3. The refrigerant is condensed and liquefied in heat exchanger 32, and in this process, the refrigerant radiates its latent heat. The liquefied refrigerant is supplied through expansion valve 59 to indoor heat exchanger 16, where the refrigerant evaporates into a gaseous state. At this time, the refrigerant absorbs heat from the room air which is circulated by indoor fan 18, thereby cooling the room. The gasified refrigerant is returned to compressor 28 through four-way valve 36 and accumulator 64. The cooling operation is performed by the repetitive execution of the above cooling cycle.

With the air conditioner configured as described above, the combustion rate of the burner is controlled in accordance with to the difference between the actual room temperature and the preset temperature, during the heating operation. Also, the combustion rate of the burner, when it is in a specified range, is controlled in accordance with the temperature of the refrigerant flowing into the refrigerant heating unit. Therefore, it is possible to securely prevent the water vapor in the combustion gas from condensing on the inner surface of guide duct 42 while performing a good heating operation. Hence, it is possible to prevent the corrosion of refrigerant heating unit 30, and to thereby improve the durability of the air conditioner.

It is to be noted that the present invention is not limited to be above-described embodiment, and that various changes and modifications may be made therein without departing from the scope of the invention.

For example, the number of burner operation levels, the range of burner operation levels wherein the inlet temperature control is performed, and the temperature T as the reference for the inlet temperature control are not limited to those in the above embodiment but can be varied as required. In the refrigerant heating unit in the above embodiment, heat exchanger section 38 is arranged in guide duct 42, but the heat exchanger section may be closely arranged on the outer surface of the guide duct. Further, instead of providing outdoor heat exchanger 32 exclusively for cooling, the heat exchanger section of the refrigerant heating unit may be used as an outdoor heat exchanger for cooling.

What is claimed is:

1. A refrigerant-heating type heating apparatus, comprising:
   a refrigeration cycle including a compressor, an indoor heat exchanger arranged in a room, a refrigerant-heating unit for heating the refrigerant, and refrigerant tubes connecting the above components to each other, the refrigerant heating unit having a heat exchanger section through which a refrigerant flows, heating means whose combustion rate is adjustable, and guide means for guiding a combustion gas produced by the combustion of the heating means so as to heat the refrigerant flowing through the heat exchanger section;
   room temperature detecting means for detecting the temperature of the room;
   temperature presetting means for presetting a desired room temperature;
   refrigerant temperature detecting means for detecting the temperature of a refrigerant flowing into the heat exchanger section of the refrigerant-heating means; and
   control means for driving the heating means at a combustion rate according to the difference between the room temperature detected by the room temperature detecting means and the preset temperature preset by the temperature presetting means, and for shifting the combustion rate of the heating means, in accordance with the refrigerant temperature detected by the refrigerant temperature detecting means, so as to prevent the condensation of water vapor in the combustion gas flowing through the guide means when the combustion rate of the heating means is in a specified range.

2. A heating apparatus according to claim 1, wherein said heating means has a plurality of combustion levels, and said control means raises the combustion level of the heating means by one step when the refrigerant temperature detected by the refrigerant temperature detecting means falls below a specified temperature.

3. A heating apparatus according to claim 2, wherein said control means samples the refrigerant temperature detected by the refrigerant temperature detecting means for a specified number of times within a specified time period and compares an average temperature of the sampling temperatures with the specified temperature.

4. A heating apparatus according to claim 1, wherein said heating means has a burner, and the refrigerant heating unit includes fuel gas supply means, a supply tube connecting the burner with the fuel gas supply means, and valve means provided in the supply tube, for adjusting the flow rate of a fuel gas supplied from fuel gas supply means to the burner, the valve means being driven by the control means.

5. A heating apparatus according to claim 1, wherein said guide means includes a guide duct, and the heating means and heat exchanger section are arranged in the guide duct.

* * * * *